March 27, 1928. 1,664,069

J. R. FLEMING

MINE CAR TRUCK FRAME

Filed April 23, 1927 3 Sheets-Sheet 1

WITNESS:

INVENTOR

James R. Fleming
BY
ATTORNEYS.

March 27, 1928. 1,664,069
J. R. FLEMING
MINE CAR TRUCK FRAME
Filed April 23, 1927 3 Sheets-Sheet 2

WITNESS:
Rob R Kitchel.

INVENTOR
James R. Fleming
BY
Busser and Harding
ATTORNEYS.

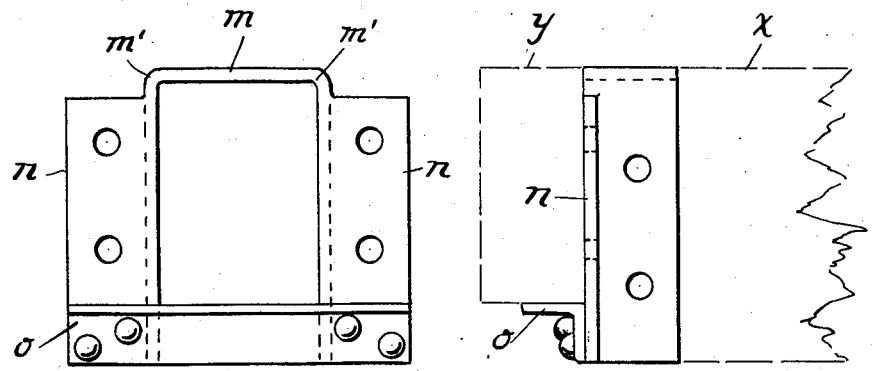
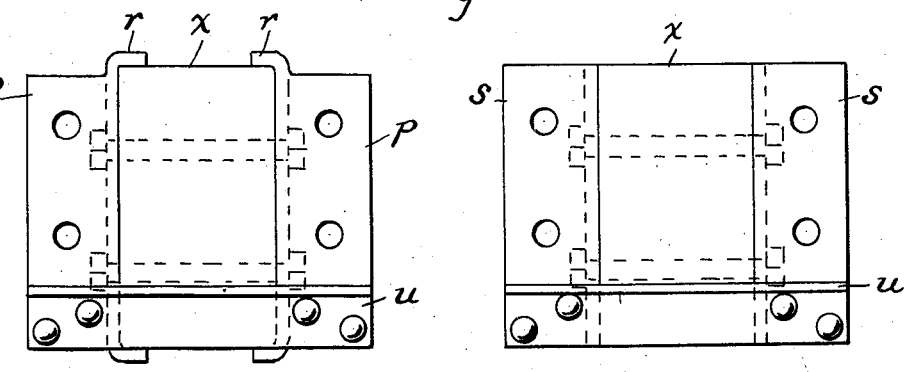
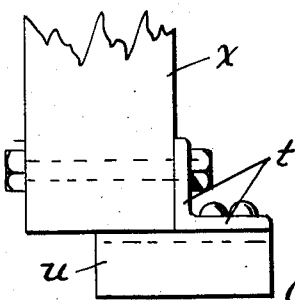

Patented Mar. 27, 1928.

1,664,069

UNITED STATES PATENT OFFICE.

JAMES R. FLEMING, OF SCRANTON, PENNSYLVANIA.

MINE-CAR-TRUCK FRAME.

Application filed April 23, 1927. Serial No. 185,935.

Mine cars, and other industrial cars, which are subjected to severe usage, are frequently seriously damaged or ruined by breakage at the corners of the truck frame. The object of my invention is to so strengthen the corners of this frame as to guard against such accidental breakage.

The invention comprises a bracket which is arranged to receive the adjacent ends of the side sill and end sill of the frame and to be bolted thereto. The bracket may be of the double end type or of the single end type. It may comprise a single frame that is bolted to both sills, or it may comprise two frames each of which is bolted to both sills. Both sills may rest on the frame in addition to being bolted thereto, or only one of the sills may rest on the frame.

In the accompanying drawings, which illustrate various embodiments of my invention—

Fig. 9 is an end view, similar to Fig. 2, of a modified form of double end bracket.

Fig. 10 is a side view of the bracket of Fig. 9 attached to a side sill.

Fig. 11 is a plan view of same.

Figs. 12 and 13 are end views, similar to Figs. 2 and 9, of other modifications of the double end bracket.

Fig. 14 is a plan view, similar to Fig. 11, of a modified single end bracket.

Figure 1:
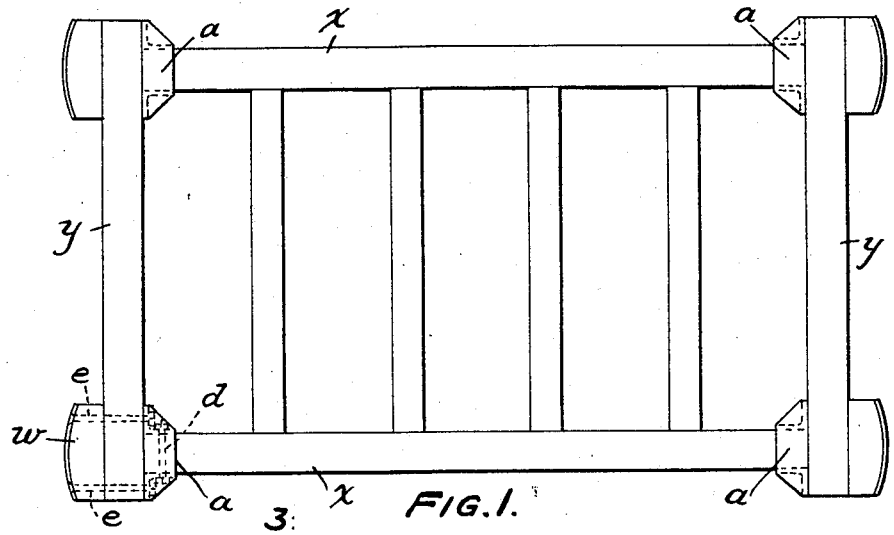
Fig. 1 is a plan view of the car frame or truck with brackets uniting the side and end sills at the corners, the brackets being of the double end type shown in detail in Figs. 2, 3 and 4.
Figures 2, 3:
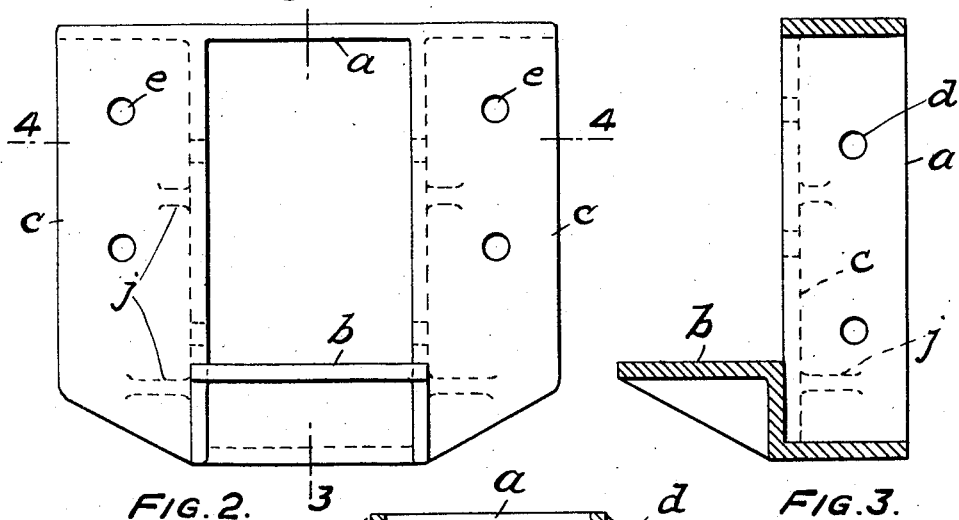
Fig. 2 is an end view of a double end bracket embodying my invention.
Fig. 3 is a vertical section on the line 3—3 of Fig. 2.
Figure 4:
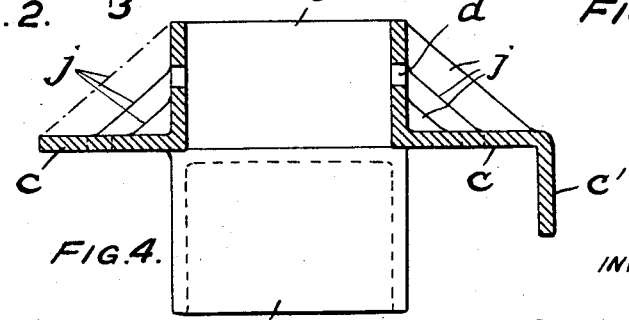
Fig. 4 is a horizontal section on the line 4—4 of Fig. 2, with a lip (not shown in Figs. 2 and 3) added thereto.

Referring first to the double end bracket construction shown in Figs. 1 to 4 inclusive: A rectangular frame $a$, open at both ends, encloses the end of a side sill $x$. The bottom of the frame is extended to form an angle plate $b$ that affords a ledge extending in front of frame $a$ and supporting one end of an end sill $y$. The end of sill $x$ abuts against the side of sill $y$. Bolts $d$ secure sill $x$ within frame $a$. Frame $a$ is provided at opposite sides with laterally extending upright wings $c, c$. End sill $y$ extends between wings $c, c$ and a block $w$, which acts as a buffer, and bolts $e$ extend through block $w$, sill $y$ and wings $c, c$.

One of the wings $c$ may be provided with a forwardly extending lip or flange $c'$ (Fig. 4) against which the end of end sill $y$ abuts; but this lip may be omitted.

Reinforcing webs $j$ connect the side plates of frame $a$ and the wings $c, c$.

Figure 5:
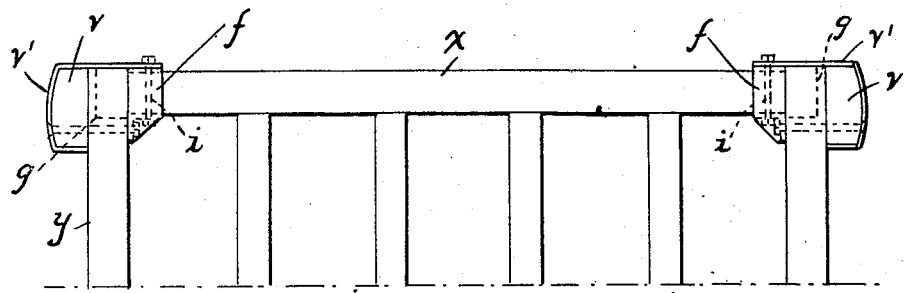
Fig. 5 is a plan view of half a car frame or truck with brackets uniting the side and end sills at the corners, the brackets being of the single end type shown in detail in Figs. 6, 7 and 8.
Figures 6, 7:
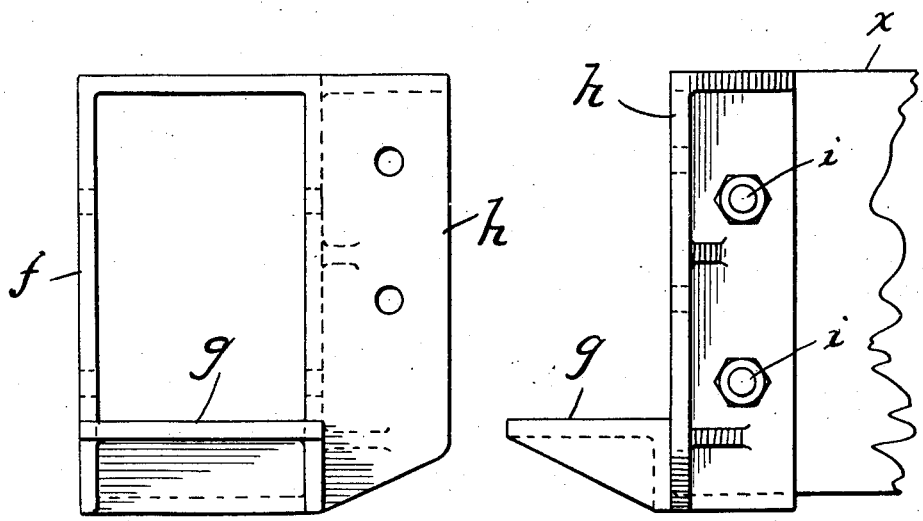
Fig. 6 is an end view of a single end bracket embodying my invention.
Fig. 7 is a side view of the bracket of Fig. 6, shown attached to a side sill.
Figure 8:
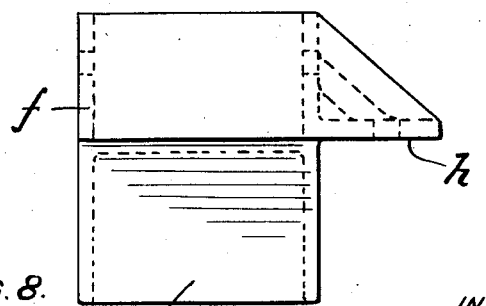
Fig. 8 is a plan view of the bracket shown in Figs. 6 and 7.

The single end bracket construction, shown in Figs. 5 to 8 inclusive, comprises an open-ended rectangular frame $f$, similar to frame $a$, an angle plate $g$ similar to angle plate $b$, and a single lateral wing $h$ similar to one of the wings $c$. The end of a side sill $x$ extends within frame $f$ and is secured thereto by bolts $i$. The end of end sill $y$ rests on angle plate $g$ and is secured, by bolts, between wing $h$ and block $v$. The metal sheath $v'$ of block $v$ extends around over the end of end sill $y$ and is secured to sill $x$ by the bolts $i$.

In Figs. 9, 10 and 11 is shown a modification in which the frame $m$, which, like frames $a$ and $f$, receives the end of the side sill, is open at the bottom as well as at the ends. This frame may be conveniently constructed of a bar of angle iron, one flange of which is cut away for approximately one-third its length midway between its ends. By bending the other flange on the lines $m'$, $m'$, there is formed an open-bottomed, open-ended frame $m$ to receive the side sill, and the remaining end sections of the cut-away flange form the wings $n$ (corresponding to wings $c$ and $h$) to which the end sill $y$ is bolted. An angle plate $o$, bolted to wings $n, n$, affords, like angle plates $b$ and $g$, a support for the end sill $y$.

Fig. 12 shows a modification which differs from that shown in Fig. 9 in that the frame that receives the end of the side sill $x$ is open at the top as well as at the ends and bottom. It is, in fact, made of two separate angle irons $p$ between which the side sill is secured by bolts extending through the angle irons and sill. Each angle iron has the flange thereof to which the end sill is bolted cut away at opposite ends, and the projecting ends of the other flange (to which the side sill is bolted) forms ears $r$ that are bent over the upper corner and under the lower corner of the side sill $x$.

Fig. 13 shows the same construction as Fig. 12 except that the angle irons $s$ (corresponding to angle irons $p$) are unprovided with ears.

Fig. 14 corresponds to the construction shown in Fig. 12 or Fig. 13 except that only one angle iron $t$ (corresponding to one of the angle irons $p$ or $s$) is employed.

In each of the three constructions shown in Figs. 12, 13 and 14, angle plates $u$, forming, like angle plates $b$, $g$ and $o$, supports for the end sills, are riveted to the bracket to which the sills are bolted.

Having now fully described my invention, what I claim and desire to protect by Letters Patent is:

1. A car truck frame comprising end sills, side sills extending between the end sills, and a bracket at each corner; each bracket comprising an upright plate engaging the side of a side sill, an upright wing extending laterally from said plate, bolts securing the side sill to said plate, and bolts securing the end sill to said wing; and a ledge carried by said bracket and supporting the end sill.

2. A car truck frame comprising end sills, side sills extending between the end sills, and a bracket at each corner; each bracket comprising plates between which the end of a side sill extends, an upright wing extending laterally from one of said plates, bolts securing the side sill between said plates, and bolts securing the end sill to said wing.

3. A car truck frame comprising end sills, side sills extending between the end sills, and a bracket at each corner; each bracket comprising plates between which the ends of a side sill extend, upright wings extending laterally outward from the respective plates, bolts securing the side sill between said plates, and bolts securing the end sill to said wings.

4. A car truck frame comprising end sills, side sills extending between the end sills, and a bracket at each corner; each bracket comprising a rectangular frame open at both ends and enclosing the end of a side sill, an upright wing extending laterally from one side of said frame, bolts securing the side sill within the said frame, and bolts securing the end sill to said wing.

5. A car truck frame comprising end sills, side sills extending between the end sills, and a bracket at each corner; each bracket comprising a rectangular frame open at both ends and enclosing the end of a side sill, and upright wings extending in the same plane laterally from opposite sides of said frame, bolts securing the side sill within said frame, and bolts securing the end sill to both said wings.

6. A corner frame for connecting the adjacent ends of the side sills and end sills of a car truck frame, the same comprising an upright plate to which one sill is adapted to be bolted, an upright wing extending laterally from said plate and to which the other sill is adapted to be bolted, and a forwardly extending sill-supporting ledge above the level of the bottom of said plate.

7. A corner frame for connecting the adjacent ends of the side sills and end sills of a car truck frame, the same comprising two plates adapted to confine between them one of said sills, an upright wing extending laterally from one of said plates and to which the other sill is adapted to be bolted, and a forwardly extending sill-supporting ledge above the level of the lower ends of said plates.

8. A corner frame for connecting the adjacent ends of the side sills and end sills of a car truck frame, the same comprising two plates adapted to confine between them one of said sills, upright wings extending at right angles to the respective plates and to which the other sill is adapted to be bolted, and a forwardly extending sill-supporting ledge above the level of the lower ends of said plates.

9. A corner frame for connecting the adjacent ends of the side sills and end sills of a car truck frame, the same comprising a rectangular frame open at opposite ends and adapted to enclose the end of one of said sills, an upright wing extending laterally from said frame and to which the other sill is adapted to be bolted, and a forwardly extending sill-supporting ledge.

10. A corner frame for connecting the adjacent ends of the side sills and end sills of a car truck frame, the same comprising a rectangular frame open at opposite ends and adapted to enclose the end of one of the sills, upright wings extending in the same plane laterally from said frame and to which the side of the other sill is adapted to be bolted, and a forwardly extending sill-supporting ledge.

11. A car truck frame comprising end sills, side sills extending between the end sills, one or more upright plates, one or more upright wings, a forwardly extending ledge above the level of the lower end of said plate or plates, a buffer block, the side sill engaging said plate or plates, the end sill resting on said ledge and engaging said wing or wings, bolts extending through said plate or plates and the side sill, and bolts extending through said block, said end sill and said wing or wings.

In testimony of which invention, I have hereunto set my hand, at Scranton, Pa., on this 29th day of March, 1927.

JAMES R. FLEMING.